United States Patent [19]

Komoto et al.

[11] Patent Number: 4,666,005
[45] Date of Patent: May 19, 1987

[54] ELECTRONIC BALANCE

[75] Inventors: Akira Komoto, Otsu; Kunio Shimauchi, Kyoto, both of Japan

[73] Assignee: Shimadzu Corporation, Kyoto, Japan

[21] Appl. No.: 828,497

[22] Filed: Feb. 11, 1986

[30] Foreign Application Priority Data

Feb. 25, 1985 [JP] Japan .................................. 60-36203

[51] Int. Cl.$^4$ ...................... G01G 21/28; G01G 23/00
[52] U.S. Cl. ..................................... 177/180; 177/241; 177/245
[58] Field of Search ............................... 177/180–182, 177/241, 245

[56] References Cited

U.S. PATENT DOCUMENTS 4,465,152  8/1984  Schmitter ............................ 177/180
4,548,288 10/1985  Komoto ............................... 177/180

FOREIGN PATENT DOCUMENTS 1036228  7/1966  United Kingdom ................ 177/180

Primary Examiner—George H. Miller, Jr.
Attorney, Agent, or Firm—Koda and Androlia

[57] ABSTRACT

An electronic balance devised so that the weighing pan of the balance may settle down fast to make the balance indicate a correct value of measurement quickly without being long disturbed by the air turbulence arising when the door of the weighing pan protecting chamber of the balance is opened and continuing for a while after the door has been closed. This electronic balance is provided with a heater on the base portion of the weighing pan protecting chamber so that the heater is located just below the door of the chamber. The heater generates hot air streams rising upward therefrom along the outer surface of the door. When the door is opened, the air streams play a role of an air curtain to prevent a possible air exchange between the hotter chamber warmed by the electronic circuit of the balance and the cooler surrounding atmosphere.

6 Claims, 11 Drawing Figures

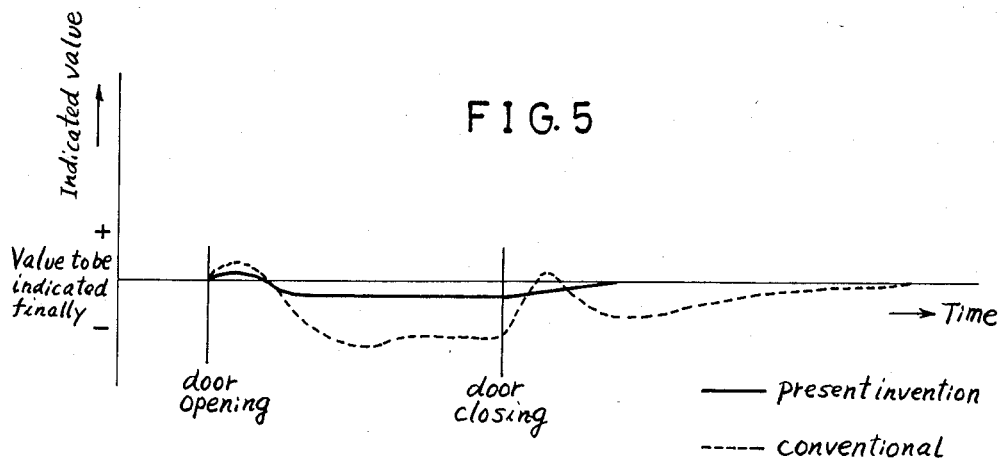
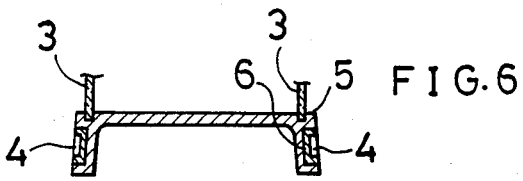
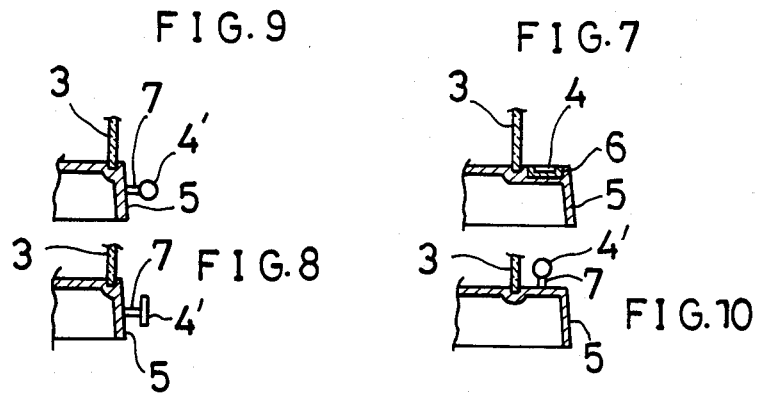
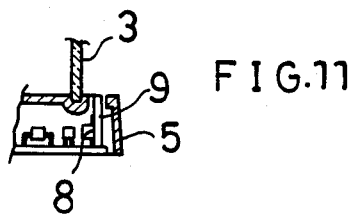

ELECTRONIC BALANCE

BACKGROUND OF THE INVENTION

The present invention relates to an electronic balance, and more particularly to an electronic balance devised so that the weighing pan encased in a weighing chamber can be protected from the air turbulence which may arise, when the door of the chamber is opened, owing to the temperature difference between the inside space of the chamber and the outer atmospheric space surrounding the chamber.

Almost all of the precision balances, not restricted to electronic ones, have their weighing pans encased in a weighing chamber so as to prevent atmospheric air streams and an operator's breathing from disturbing the stabilization of the weighing pans. The doors of the chamber are to be opened only when a sample to be weighed and balancing weights (in case of non-electronic mechanical balances) are placed on or removed from the weighing pans. A weight measuring operation is carried out with the doors kept closed.

Incidentally, in case of an electronic balance, the temperature in the weighing chamber is somewhat higher than that of the ambient atmosphere when the balance is kept ready to operate, because the electronic parts and circuits employed in the balance have been energized, therefore, when the door of the chamber is opened a temperature difference between the inside and outside of the chamber causes the warm air in the chamber to be exchanged with the cool ambient atmospheric air, and produces air turbulence in the chamber. In addition, since the cool air taken into the chamber is then warmed up by the warm floor of the chamber, there arise convectional air streams in the chamber after the door has been closed. The convectional air movement continues until a temperature equilibrium is established in the chamber. The air turbulence and convectional air movement, of course, cause the weighing pan to fluctuate, and as a result, make the balance take a long time to indicate a correct value of weight measurement.

OBJECT AND SUMMARY OF THE INVENTION

Therefore, the object of the present invention is to provide an electronic balance which is devised so that the weighing pan can be effectively protected from a possible disturbance due to air turbulence and convectional air streams arising when and after the door of the weighing chamber is opened for the purpose of placing a sample on the weighing pan or removing it therefrom.

To achieve the above object, the electronic balance based on the present invention is provided with heat radiating elements outside the base portion of the weighing chamber so that the elements may be located below the doors of the chamber. These heat radiating elements produce warm air streams rising up along the outside surface of the doors of the chamber while the doors are kept closed. Therefore, when the doors are opened, the warm air streams play a role of an air curtain between the opened space of the chamber and the surrounding cool atmosphere, suppressing the air exchange in the chamber.

BRIEF DESCRIPTION OF THE INVENTION

The details of the present invention will be made clear by both the claims of the present application and the exemplified embodiments described in the following in reference to the accompanying drawings, in which:

FIG. 5 is a graphic representation showing the qualitative performance of the present invention in comparison with the performance of a conventional electronic balance; and FIGS. 6 to 11 show cross-sectional views illustrating alternative application methods of the heat radiating elements employed in six modified embodiments of the present invention.

DETAILED DESCRIPTION OF THE INVENTION

Figure 1:
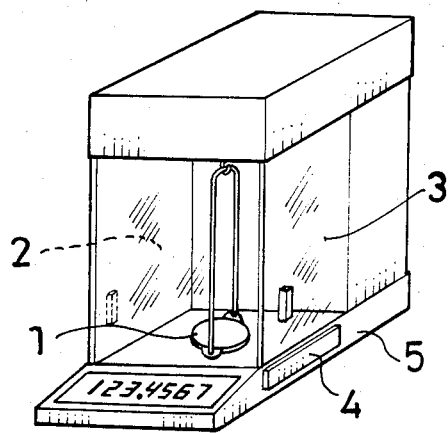
FIG. 1 shows a perspective outer view of an embodiment the present invention.
Figure 2:
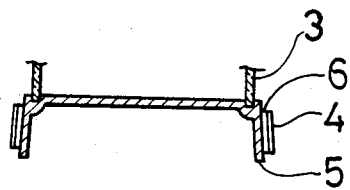
FIG. 2 shows a cross-sectional view illustrating the application method of heat radiating elements employed in the above embodiment.

Referring to FIG. 1, which shows a perspective outer view of an embodiment of the present invention, a rectangular-shaped electric heaters 4 as heat radiating elements are fixed to the outer surfaces on both sides of the base portion 5 of an electronic balance. Just above the heaters 4 there are located doors 3 constituting parts of a weighing chamber 2, in which a weighing pan 1 is hanged down. The heaters 4 have a length nearly equal to the opening width of the doors 3. The application of the heaters 4 to the base portion 5 of the balance is made, as is shown in FIG. 2, with insulators 6 laid therebetween.

Figure 3:
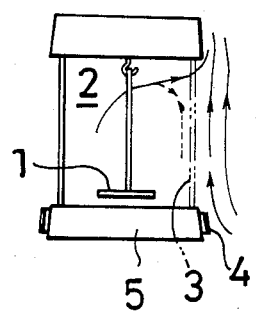
FIG. 3 illustrates a warm air curtain made by one of the heat radiating elements shown in FIG. 2.
Figure 4:
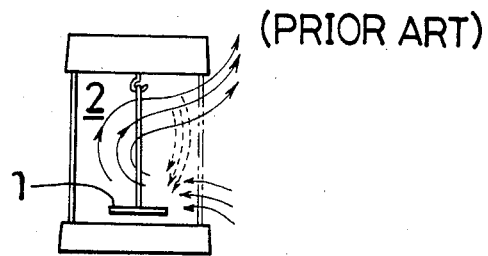
FIG. 4 illustrates possible air streams arising in case of a conventional electronic balance when the door of the chamber is opened.

In such a constitution of the embodiment, each of the heaters 4 produces warm air streams rising up along the outer surface of the corresponding doors 3 of the weighing chamber 2. The heaters 4 are designed so that the temperature of the air streams may be substantially equal to the temperature of the already warmed air in the weighing chamber 2. The temperature equality results in density equality between the air in the chamber and the air streams. With one of the doors 3 opened, the air streams play a role of an air curtain, as is shown in FIG. 3, between the opened chamber space and the outside atmosphere, and the air curtain, whose air density is equal to the air density in the chamber 2, suppresses a sudden air exchange in the chamber. Thus the weighing pan 1 is made free from the disturbance due to both the air turbulence arising when the door 3 is opened and the convectional air streams appearing after the door 3 has been closed.

The performance of the present invention is shown in FIG. 5, which is a qualitative graphic representation of zero-weight (or constant-weight) indication fluctuations both of the above embodiment (solid line) and of a conventional balance (dashed line), which fluctuations are due to opening the door of the weighing chamber of the respective apparatuses. As is shown by FIG. 5, the indication fluctuation settles down about two times faster in case of the present invention than in case of the conventional electronic balance. Although in practice an indication fluctuation due to loading a sample on the weighing pan 1 or unloading the sample therefrom is of course added to the fluctuation shown by FIG. 5, it is needless to say that the present present invention makes the fluctuation settle down faster.

The present invention can be embodied also by embedding the heaters 4, as is shown in FIG. 6, in the skirt of the base 5, or, as is shown in FIG. 7, in the upper surface of the base 5 with the base 5 designed so as to have a stretch on both sides. Further, when occasion demands, the heaters 4 may be fixed with heater supports 7 used, as is shown in FIG. 8, to locate the heaters 4 apart from the base 5 at a distance.

FIGS. 9 and 10 show the cases in which the heat radiating elements are embodied in the form of a bar type heater 4'.

FIG. 11 shows a further possible embodiment, in which radiators of the heat dissipating electronic parts (such as power transistors) used in the electronic circuit of the balance doubles as the heat radiating elements characterizing the present invention. In this embodiment the power consumption necessary for the heat radiating elements can, of course, be saved.

We claim:

1. An electronic balance having its weighing pan protected in a weighing chamber having an access door for giving access to said weighing pan, said electronic balance comprising a heat radiating element provided outside on the base portion of said weighing chamber so as to be located below said access door.

2. An electronic balance defined in claim 1, wherein said heat radiating element is a rectangular plate-shaped heater fixed to said base portion with a thermal insulator inserted therebetween, said rectangular plate-shape heater having a length substantially equal to the width of the opening of said access door.

3. An electronic balance defined in claim 1, wherein said heat radiating element is a bar-shaped heater fixed to said base portion through a heater supporting means whereby said heater is located apart from said base portion at a predetermined distance, said bar-shaped heater having a length substantially equal to the width of the opening of said access door.

4. An electronic balance defined in claim 1, 2 or 3, wherein said heat radiating element is heat-supplied from any heat dissipating electronic element used in said electronic balance.

5. An electronic balance defined in claim 1, 2 or 3, wherein said base portion has a flat extension under said access door, on which flat extension said heat radiating element is provided.

6. An electronic balance defined in claim 5, wherein said heat radiating element is heat-supplied from any heat dissipating electronic element used in said electronic balance.

* * * * *